US009681024B2

United States Patent
Yoshizawa

(10) Patent No.: US 9,681,024 B2
(45) Date of Patent: Jun. 13, 2017

(54) IMAGE PROCESSING APPARATUS, CONTROL METHOD, AND COMPUTER-READABLE RECORDING MEDIUM CONFIGURED TO PERFORM ERROR DIFFUSION PROCESS HAVING AND ADDER TO ADD AN ERROR INTERGRATED VALUE DIFFUSED TO THE TARGET PIXEL, THE GREEN NOISE AND THE PREDETERMINED NOISE, TO THE PIXEL VALUE OF THE TARGET PIXEL

(71) Applicant: Konica Minolta, Inc., Tokyo (JP)

(72) Inventor: Masanori Yoshizawa, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/667,250

(22) Filed: Mar. 24, 2015

(65) Prior Publication Data

US 2015/0269462 A1 Sep. 24, 2015

(30) Foreign Application Priority Data

Mar. 24, 2014 (JP) ................................. 2014-059537

(51) Int. Cl.
*H04N 1/50* (2006.01)
*G06K 15/02* (2006.01)
*H04N 1/405* (2006.01)

(52) U.S. Cl.
CPC .......... *H04N 1/50* (2013.01); *G06K 15/1881* (2013.01); *H04N 1/4051* (2013.01)

(58) Field of Classification Search
None
See application file for complete search history.

(56) References Cited

U.S. PATENT DOCUMENTS

| 8,670,158 | B2* | 3/2014 | Saka | ....................... | H04N 1/233 358/3.1 |
| 2009/0310161 | A1* | 12/2009 | Kawamura | .......... | H04N 1/4052 358/1.9 |
| 2012/0020584 | A1* | 1/2012 | Yoshizawa | ........... | H04N 1/4052 382/274 |

FOREIGN PATENT DOCUMENTS

| JP | H05-103204 A | 4/1993 |
| JP | 2004-274179 A | 9/2004 |
| JP | 2008-219291 A | 9/2008 |

(Continued)

OTHER PUBLICATIONS

Office Action issued in corresponding Japanese Application No. 2014-059537, mailed Mar. 15, 2016 (12 pages).

*Primary Examiner* — Christopher D Wait
(74) *Attorney, Agent, or Firm* — Osha Liang LLP

(57) ABSTRACT

An image processing apparatus receiving a pixel value of a multivalue image includes: an input noise generating section that generates a noise; a green noise generating section that generates a green noise from an output value of a binarized processed pixel; an adder section that adds an error integrated value, the green noise and the noise, to the pixel value of the target pixel; the threshold value processing section that binarizes the pixel value of the target pixel after adding the error integrated value, the green noise and the noise; a subtractor section that calculates an error value by calculating a difference between an output value of the binarized target pixel and the pixel value of the target pixel including the error integrated value and the noise; and an error integrating section that outputs the error integrated value by using the error value of the binarized processed pixel.

12 Claims, 10 Drawing Sheets

(56) References Cited

FOREIGN PATENT DOCUMENTS

| JP | 2009-303185 A | 12/2009 |
| JP | 2011-082892 A | 4/2011 |

\* cited by examiner

| TYPE OF SCREEN | | Y | M | C | K |
|---|---|---|---|---|---|
| SCREEN A | LPI | 150.0 LPI | 166.4 LPI | 166.4 LPI | 189.7 LPI |
| | ANGLE | 90° | 56.3° | -56.3° | -71.6° |
| SCREEN B | LPI | 200.0 LPI | 189.7 LPI | 189.7 LPI | 212.1 LPI |
| | ANGLE | 90° | -71.6° | 71.6° | -45° |
| SCREEN C | LPI | 240.0 LPI | 268.3 LPI | 268.3 LPI | 282.8 LPI |
| | ANGLE | 90° | 63.4° | -63.4° | 45° |

| | I → | | | | |
|---|---|---|---|---|---|
| J ↓ | 1 | 2 | 3 | 4 | 5 |
| 1 | 0 | 0 | 0 | 0 | 0 |
| 2 | 0 | 1/16 | 5/16 | 3/16 | 0 |
| 3 | 0 | 7/16 | ■ | | |

| | I → | | | | |
|---|---|---|---|---|---|
| J ↓ | 1 | 2 | 3 | 4 | 5 |
| 1 | 0 | 0 | 0 | 0 | 0 |
| 2 | 0 | 0 | 1/2 | 0 | 0 |
| 3 | 0 | 1/2 | ■ | | |

FIG.8

SET GREEN NOISE INTENSITY

| WEAK | STANDARD | STRONG |

IMAGE PROCESSING APPARATUS, CONTROL METHOD, AND COMPUTER-READABLE RECORDING MEDIUM CONFIGURED TO PERFORM ERROR DIFFUSION PROCESS HAVING AND ADDER TO ADD AN ERROR INTERGRATED VALUE DIFFUSED TO THE TARGET PIXEL, THE GREEN NOISE AND THE PREDETERMINED NOISE, TO THE PIXEL VALUE OF THE TARGET PIXEL

BACKGROUND OF THE INVENTION

Field of the Invention

The present invention relates to an image processing apparatus, a controlling method in the image processing apparatus, and a computer-readable recording medium which stores a program.

Description of Related Art

Heretofore, there has been known a configuration where green noises are superimposed on image data when image data of multiple values are binarized by error diffusion processing (e.g. see Japanese Patent Application Laid-Open Publication No. 2008-219291).

FIG. 13 is a block diagram illustrating processing contents of a conventional error diffusing section 100 having a configuration to superimpose the green noises.

In FIG. 13, the error diffusing section 100 receives input data having multiple pixel values (e.g. 8 bits). A first adder section 101 adds, to input data of a target pixel, an error integrated value that is output from an error integrating section 105 and should be diffused from pixels (peripheral pixels) surrounding the target pixel. A second adder section 102 adds a green noise value output from a green noise generating section 103 to the output value of the first adder section 101. A binarizing section 104 compares the output values of the second adder section 102 with a predetermined threshold value, and outputs a binarization result (binary image data).

The green noise generating section 103 previously stores the binarization results of the pixels binarized earlier than the target pixel, and outputs the green noise superimposed on the target pixel on the basis of the binarization results of the peripheral pixels. Specifically, the green noise generating section 103 outputs the green noise on the basis of the binarization results of the peripheral pixels and a filter (green noise filter) having predetermined weighting factors with respect to the respective peripheral pixels. The second adder section 102 adds the output green noise to the output value of the first adder section 101.

A subtractor section 106 subtracts the output value of the first adder section 101 from the binarization result output from the binarizing section 104, and outputs an error value due to binarization executed by the binarizing section 104.

The error integrating section 105 previously stores the error values of the pixels binarized earlier than the target pixel, and outputs the error integrated value diffused to the target pixel on the basis of the error values of the peripheral pixels. Specifically, the error integrating section 105 outputs the error integrated value on the basis of the error values of the peripheral pixels and a filter (error integration filter) having predetermined weighting factors with respect to the respective peripheral pixels. The first adder section 101 adds the output error integrated value to the input data of the target pixel.

The above-described conventional error diffusion processing, which superimposes the green noises, feeds back the binarization results of the pixels binarized earlier than the target pixels into a binarization processing of the target pixel. According to this feedback, when the peripheral pixels include a black pixel(s) (pixel(s) whose binarization result is one (1)), the target pixel tends to become a black pixel, which makes the black pixels more concentrated in the binarized image. As a result, the image can be prevented from being uneven when being formed based on the binary image, and density reproductivity can be improved even when image formation conditions such as temperature and humidity fluctuate.

However, with the conventional error diffusion processing, which superimposes the green noises, periodic patterns (artifacts) occur when a uniform image having an intermediate density as input data is binarized, and accordingly quality of the after-binarization output image lowers.

This is because the black pixels appear at a predetermined period due to two conditions occurring at the same time, the conditions including: a first condition that the green noise takes the value at which the target pixel tends to become the black pixel, when the black pixels in the binarization results of the peripheral pixels coincide with the predetermined arrangement corresponding to the weighting factors of the green noise filter, and therefore the target pixel tends to be binarized into the black pixel by the superimposed green noise in the intermediate density in which the arrangement of the black pixels starts to coincide with a predetermined arrangement corresponding to the predetermined weighting factors of the green noise filter; and a second condition that when the target pixel is binarized into the black pixel in the intermediate density, large negative errors are diffused to the pixels binarized after that.

Such artifacts hardly occur in a low density image, because there are few black pixels in the binarization results of the peripheral pixels of the low density image and the green noise has little influence on the image. The artifacts hardly occur also in a high density image in comparison with the intermediate density image, because the input data itself have large values in the case of the high density image, accordingly errors due to binarization into black pixels are small, and large negative errors are hardly diffused to the pixels binarized after the target pixel. Even when some artifacts occur in the high density image, the artifacts are often less represented in the formed image, because a white pixel(s) (pixel(s) whose binarization result is zero (0)) tends to become blurred when the high density image having a high black pixel density is formed.

Thus, with the conventional error diffusion processing, which superimposes the green noises, the artifacts such as the ones illustrated in FIG. 14 occur in the intermediate density of the image after the error diffusion processing, which lowers the quality of the output image. This occurs not only to a so-called binary error diffusion processing which binarizes the input data of multiple values, but also to a so-called multivalue error diffusion processing which converts the input data of multiple values into multivalue data having a number of bits less than that of the input data.

SUMMARY OF THE INVENTION

One or more embodiments of the invention improve, in an error diffusion processing which superimposes green noises, qualities of an image after the error diffusion processing.

In one aspect, an image processing apparatus according to one or more embodiments of the present invention is reflected receives a pixel value of each pixel of a multivalue image, and includes: an input noise generating section to generate a predetermined noise; a green noise generating section to generate a green noise superimposed on a target pixel by using an after-binarization output value of a binarized processed pixel; an adder section to add an error integrated value diffused to the target pixel, the green noise and the predetermined noise, to the pixel value of the target pixel; the threshold value processing section to binarize, with a threshold value, the pixel value of the target pixel to which the error integrated value, the green noise and the predetermined noise are added; a subtractor section to calculate an error value due to binarization by calculating a difference between an output value of the target pixel after the binarization and the pixel value of the target pixel to which the error integrated value and the predetermined noise are added; and an error integrating section to output the error integrated value diffused to the target pixel, by using the error value calculated by the subtractor section with respect to the binarized processed pixel.

According to one or more embodiments, the image processing apparatus further includes: an input noise offset adjusting section to adjust an offset component of the predetermined noise generated by the input noise generating section so that the offset component of the predetermined noise has a predetermined value in minus.

According to one or more embodiments, in the image processing apparatus, the input noise offset adjusting section performs adjustment by adding the predetermined value in minus to the predetermined noise generated for the each pixel by the input noise generating section so that the offset component of the predetermined noise has the predetermined value in minus.

According to one or more embodiments, the image processing apparatus further includes: a green noise gain adjusting section to adjust a gain of the green noise generated by the green noise generating section by multiplying the green noise by a first gain value.

According to one or more embodiments, in the image processing apparatus, the green noise gain adjusting section changes the first gain value, by which the green noise is multiplied, depending on an intensity of the green noise.

According to one or more embodiments, the image processing apparatus further includes: an input noise offset adjusting section to adjust an offset component of the predetermined noise generated by the input noise generating section so that the offset component of the predetermined noise has a predetermined value in minus; and a green noise gain adjusting section to adjust a gain of the green noise generated by the green noise generating section by multiplying the green noise by a first gain value, wherein the green noise gain adjusting section changes the first gain value, by which the green noise is multiplied, depending on an intensity of the green noise, and the input noise offset adjusting section adjusts the offset component depending on the first gain value changed by the green noise gain adjusting section.

According to one or more embodiments, the image processing apparatus further includes: an input noise gain adjusting section to adjust a gain of the predetermined noise generated by the input noise generating section by multiplying the predetermined noise by a second gain value.

According to one or more embodiments, in the image processing apparatus, the input noise gain adjusting section adjusts the gain of the predetermined noise depending on the pixel value of the target pixel.

According to one or more embodiments, in the image processing apparatus, the input noise gain adjusting section makes the second gain value, at the time when the pixel value of the target pixel is not halftone, smaller than the second gain value at the time when the pixel value of the target pixel is halftone.

According to one or more embodiments, the image processing apparatus further includes: a green noise gain adjusting section to adjust a gain of the green noise generated by the green noise generating section by multiplying the green noise by a first gain value; and an input noise gain adjusting section to adjust a gain of the predetermined noise generated by the input noise generating section by multiplying the predetermined noise by a second gain value, wherein the input noise gain adjusting section adjusts the gain of the predetermined noise in response to changing of the first gain value by which the green noise is multiplied, the changing being executed by the green noise gain adjusting section depending on the intensity of the green noise.

According to one or more embodiments, in the image processing apparatus, a spatial frequency corresponding to the predetermined noise generated by the input noise generating section is a spatial frequency having low sensitivity in a human visual spatial frequency characteristic.

According to one or more embodiments, in the image processing apparatus, the predetermined noise generated by the input noise generating section is an AM screen noise or FM screen noise.

BRIEF DESCRIPTION OF THE DRAWINGS

The present invention will become more fully understood from the detailed description given hereinbelow and the appended drawings, and thus are not intended as a definition of the limits of the present invention, and wherein:

FIG. 8 is a diagram illustrating an example of a screen which receives a setting related to an intensity of a green noise.

DETAILED DESCRIPTION OF EMBODIMENTS

Hereinafter, embodiments of the present invention will be described with reference to the drawings.

First Embodiment

Figure 1:
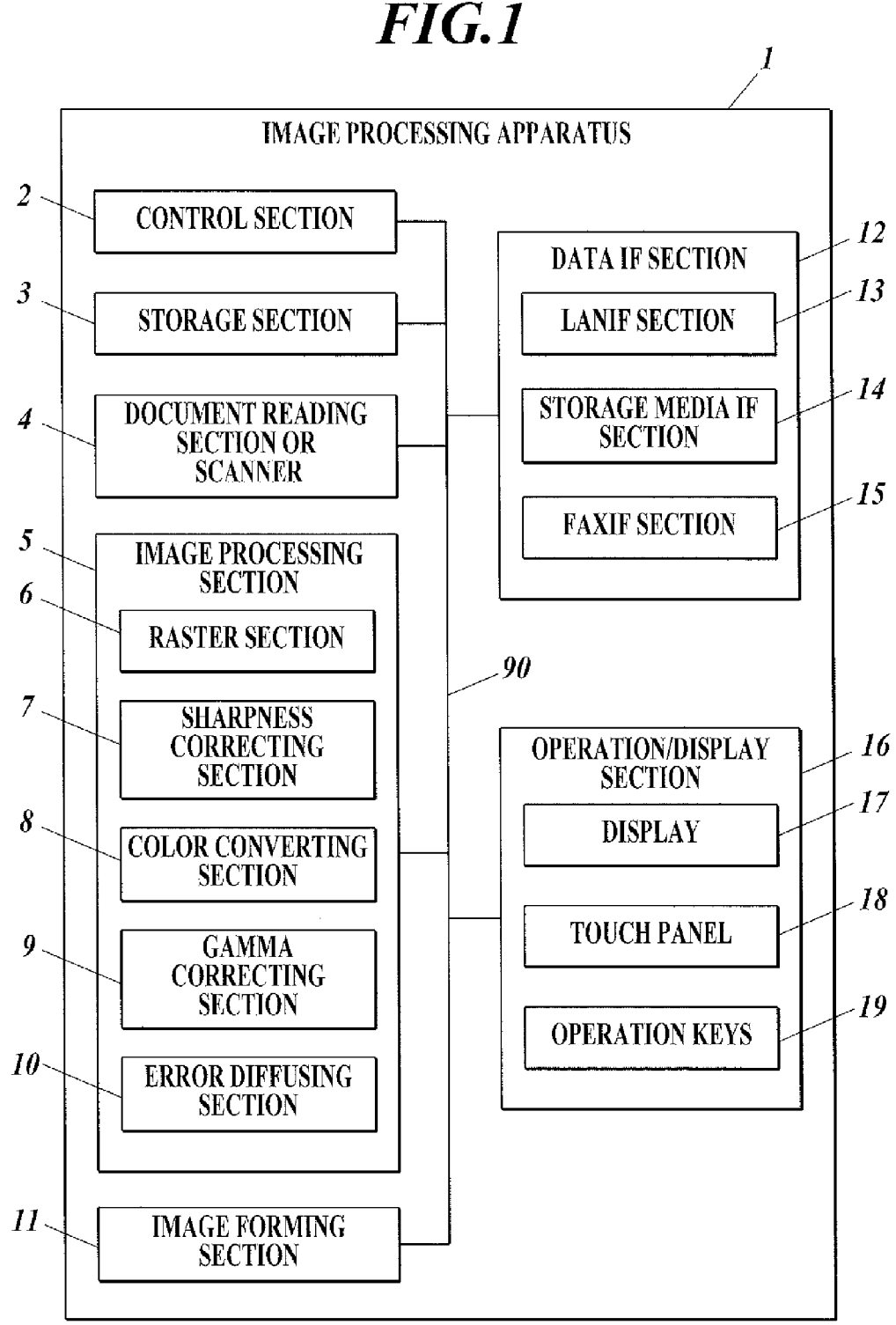
FIG. 1 is an example block diagram of an image processing apparatus 1 according to a first embodiment.

FIG. 1 is a block diagram of an image processing apparatus 1 according to the first embodiment.

The image processing apparatus 1 is a so-called Multi Function Peripheral (MFP) which can execute a copy job, print job, scan job, fax job and box job. The box job is a job executed by using data stored in boxes (folders) included in the image processing apparatus 1. Specifically, the box job includes: "box print" to print the print data stored in the boxes (folders); "box transmission" to transmit the image data stored in the boxes to other apparatus/devices via e-mail and/or protocol such as Server Message Block (SMB) and File Transfer Protocol (FTP); and "box-to-fax" to transmit the image data stored in the boxes by facsimile.

The image processing apparatus 1 is equipped with a control section 2, storage section 3, document reading section 4 (e.g. a scanner), data InterFace (IF) section 12, image processing section 5, image forming section 11 and operation/display section 16, which are connected to one another by a bus 90.

The control section 2 is mainly composed of a Central Processing Unit (CPU), and executes programs stored in the storage section 3 and controls the storage section 3, document reading section 4, data IF section 12, image processing section 5, image forming section 11 and operation/display section 16 so as to realize functions of the image processing apparatus 1.

The storage section 3 mainly includes a Random Access Memory (RAM), Read Only Memory (ROM) and Hard Disc Drive (HDD). The storage section 3 stores necessary data for realizing the functions of the image processing apparatus 1, and data related to jobs, which include the programs executed by the control section 2. The HDD also exerts the functions as the boxes.

The document reading section 4 optically reads images of documents conveyed to a reading position by an automatic document conveying device (not illustrated), or images of documents placed on a platen glass by a user, to generate read data, and causes the storage section 3 to store the generated read data.

The data IF section 12 includes a LANIF section 13, storage media IF section 14 and FAXIF section 15, and performs data transmission/reception to/from external devices (e.g. an information equipment apparatus such as a Personal Computer (PC)) or storage media. The LANIF section 13 transmits/receives the data related to jobs, via a wired or wireless LAN, to/from the PC or a portable terminal which is connected to the LAN. The storage media IF section 14 obtains the data related to jobs from a portable storage media (e.g. a Universal Serial Bus (USB) memory), and/or causes the portable storage media to store the data related to jobs. The FAXIF section 15 transmits/receives fax data through a fax line.

The image processing section 5 is, for example, an integrated circuit for image processing such as a Field Programmable Gate Array (FPGA) and Application Specific Integrated Circuit (ASIC). The image processing section 5 receives input data such as the print data obtained by the LAFIF section 13 and/or the storage media IF section 14, the fax data obtained by the FAXIF section 15, and the read data generated by the document reading section 4, and performs image processing to the input data.

The image processing section 5 includes a raster section 6, sharpness correcting section 7, color converting section 8, gamma correcting section 9 and error diffusing section 10.

The raster section 6 generates raster data based on the print data when the input data are print data in PDL format obtained by the LANIF section 13 and/or the storage media IF section 14. Specifically, the raster section 6 performs analysis processing to the print data in PDL format, converts it into intermediate language data (display list), and performs rasterize processing to the intermediate language data to generate the raster data. The format of the print data is not limited to the PDL format, and may be other formats.

The sharpness correcting section 7 executes sharpness processing and/or smoothing processing to the raster data generated by the raster section 6 or the read data generated by the document reading section 4. For example, the sharpness correcting section 7 executes the sharpness processing to edge portions of character areas or line drawing areas, and/or executes the smoothing processing to dot areas.

The color converting section 8 performs color conversion processing to the processing results of the sharpness correcting section 7, and generates Yellow (Y), Magenta (M), Cyan (C) and Black (K) data which correspond to a color property (color space) of the image forming section 11. The color converting section 8 generates the YMCK data which correspond to the color property of the image forming section 11 by using a device link profile corresponding to a color property (color space) of the input data input to the image processing section 5. For example, in the case that the input data are the read data generated by the document reading section 4, the color converting section 8 generates the YMCK data by using the device link profile corresponding to the color properties of the document reading section 4 and the image forming section 11.

The gamma correcting section 9 executes density conversion processing to the YMCK data generated by the color converting section 8. For example, the gamma correcting section 9 previously stores a Look Up Table (LUT) for density conversion, and executes the density conversion processing, based on the YMCK data generated by the color converting section 8, by referring to the LUT.

The error diffusing section 10 performs error diffusion processing to the YMCK data output from the gamma correcting section 9, and converts it into YMCK data having a smaller bit width (a number of bits) than that of the YMCK data output from the gamma correcting section 9. Hereinafter, sometimes the data input to the error diffusing section 10 is referred to as error diffusion input data, and the data output from the error diffusing section 10 is referred to as error diffusion output data. The error diffusing section 10 thus performs the error diffusion processing to the error diffusion input data to generate the error diffusion output data having the smaller bit width than that of the error diffusion input data.

Hereinafter there is described the case that the error diffusion input data has a bit width of 8 bits and the error diffusion output data has a bit width of 1 bit. The bit width of the error diffusion input data may be arbitrarily set as long as it is larger than the bit width of the error diffusion output data. For example, the bit width of the error diffusion input data may be 4 bits, 16 bits, or 24 bits. The bit width of the error diffusion output data may be arbitrarily set as long as it is smaller than the bit width of the error diffusion input data. For example, the bit width of the error diffusion output data may be 2 bits or 4 bits. The processing contents of the error diffusing section 10 will be specifically described later.

The image forming section 11 executes image formation on a recording sheet, based on the error diffusion output data, by an electrophotographic process. The process of image formation is not limited to the electrophotographic process, and may be an inkjet process or thermal ink transfer process.

The operation/display section 16 is equipped with a display 17, touch panel 18 and operation keys 19.

The display 17 is composed of, for example, a Liquid Crystal Display (LCD), and is capable of displaying operation screens. The operation screens includes, for example, a screen for receiving the settings of the image processing apparatus 1 from a user.

The touch panel 18 is disposed over the screen of the display 17, and detects coordinates of a position pressed with a pen, finger, or the like.

The operation keys 19 are, for example, hard keys, and include numeric keys and a start key. The numeric keys receive inputs of numerals and signs/marks. The start key receives start instructions of the operations of the image processing apparatus 1.

Figure 2:
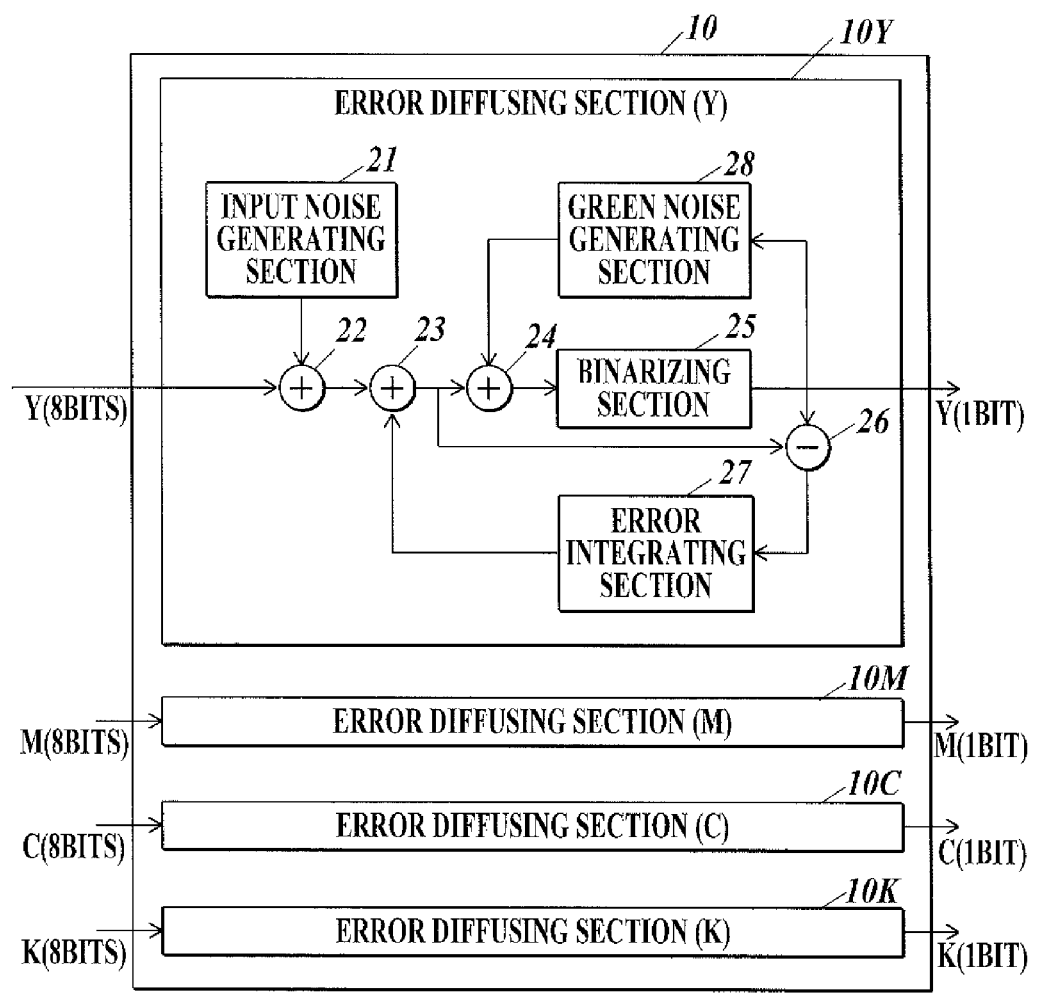
FIG. 2 is an example block diagram of an error diffusing section 10.

FIG. 2 is a block diagram of the error diffusing section 10. The error diffusing section 10 includes: an error diffusing section (Y) 10Y which executes the error diffusion processing to Y color data; an error diffusing section (M) 10M which executes the error diffusion processing to M color data; an error diffusing section (C) 10C which executes the error diffusion processing to C color data; and an error diffusing section (K) 10K which executes the error diffusion processing to K color data. Because the basic configurations of the error diffusing sections (Y) 10Y to (K) 10K are similar to one another, hereinafter only the error diffusing section (Y) 10Y will be described in detail.

The error diffusing section (Y) 10Y receives the Y color data of 8 bits, for each pixel, as the error diffusion input data. The error diffusing section (Y) 10Y performs the error diffusion processing to the Y color data of 8 bits as the error diffusion input data to generate Y color data of 1 bit as the error diffusion output data. Hereinafter a pixel(s) which is being processed by the error diffusing section (Y) 10Y is referred to as a target pixel(s).

An input noise generating section 21 generates noises (input noises) to be superimposed on the error diffusion input data. The type of the noises generated by the input noise generating section 21 is AM screen noises or FM screen noises. The input noise generating section 21 is equipped with, for example, a memory corresponding to a two-dimensional matrix, previously stores data corresponding to an input noise pattern in the memory, and refers to an address on the memory corresponding to coordinates of the target pixel to generate the input noise with respect to the target pixel. The input noise generating section 21 can also generate the input noises by using a Void-and-Cluster method.

The input noise generating section 21 generates the input noises so that an integrated value of the input noises to be superimposed on the respective pixels within a predetermined size (e.g. a size of the two-dimensional matrix) becomes zero (0). In other words, the input noise generating section 21 generates the input noises so that an offset component of the input noises becomes zero (0). Although each input noise has the value in plus (including zero) or the value in minus depending on the pixel, the offset component in the case of integrating the input noises within the predetermined size becomes zero.

Figures 3A, 3B:
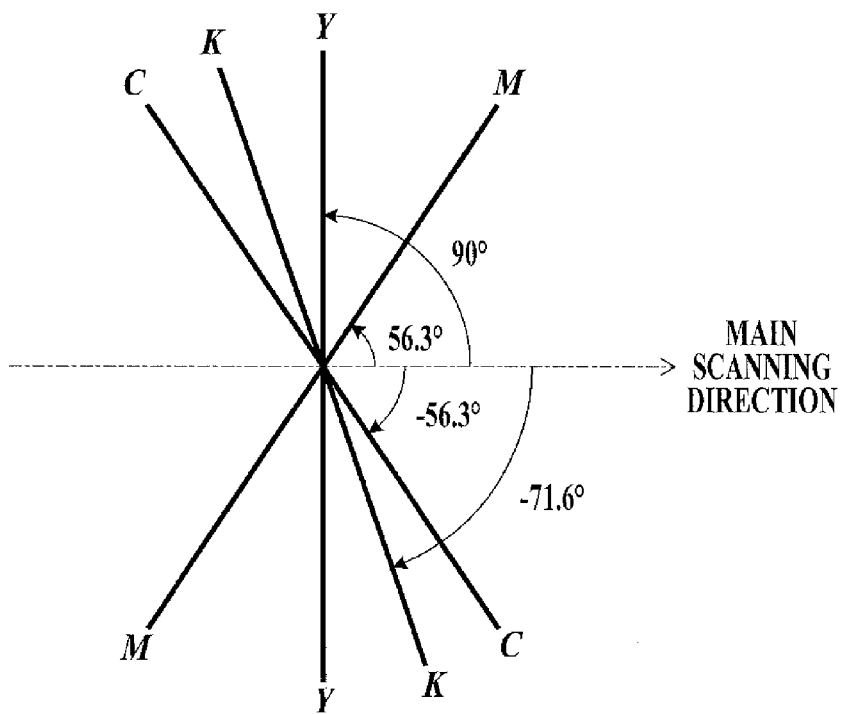
FIG. 3A is an example diagram for explaining screen parameters.
FIG. 3B is an example diagram illustrating screen angles of screen A.

When the input noise generating section 21 generates the AM screen noise, as the type of the noise, the input noise which corresponds to screen A and has a screen ruling of 150.0 lpi and a screen angle of 90 degrees as illustrated in FIG. 3A is generated. The type (property) of the screen can be defined by a screen ruling ("LPI" in FIG. 3A) and a screen angle ("ANGLE" in FIG. 3A). The screen ruling is a unit expressing fineness (spatial frequency) of the screen. The larger value the screen ruling has, the finer the screen is. The screen angle indicates an angle of the screen pattern with respect to a main scanning direction, as illustrated in FIG. 3B as the case of screen A. Alternatively, the screen angle can be defined as an angle of the screen pattern with respect to a sub scanning direction. Hereinafter sometimes the screen ruling and the screen angle are collectively referred to as screen parameters.

The screen ruling illustrated in FIG. 3A corresponds to the spatial frequency having low sensitivity in human visual spatial frequency characteristics. The generating method of the AM screen noise described above can also be applied to the FM screen noise.

A first adder section 22 adds the input noises generated by the input noise generating section 21 to the error diffusion input data.

A second adder section 23 adds output values of an error integrating section 27, which is to be described later, to the output values of the first adder section 22.

A third adder section 24 adds output values of a green noise generating section 28, which is to be described later, to the output values of the second adder section 23.

A binarizing section 25 functions as a threshold value processing section which compares the output value of the third adder section 24 with a predetermined threshold value to binarize the output value. The binarizing section 25 outputs one (1) when the output value of the third adder section 24 is larger than the predetermined threshold value, and outputs zero (0) when the output value of the third adder section 24 is equal to or less than the predetermined threshold value. The predetermined value may be set to, for example, 128. Hereinafter sometimes the output value(s) of the binarizing section 25 is referred to as a binarization result(s).

The output value (binarization result) of the binarizing section 25 is output, as the output value (error diffusion output data) of the error diffusing section (Y) 10Y, to the image forming section 11.

A subtractor section 26 outputs a value obtained by subtracting 255 from the output value of the second adder section 23, as an error to be diffused to pixels (peripheral pixels) surrounding the target pixel, when the binarization result is one (1). The subtractor section 26 outputs a value obtained by subtracting zero (0) from the output value of the second adder section 23, as the error to be diffused to the peripheral pixels, when the binarization result is zero (0). Thus, the subtractor section 26 calculates the difference between the binarization result and the output value of the second adder section 23 to calculate the error value due to binarization.

For example, when the output value of the second adder section 23 is 150 and the binarization result is one (1), the subtractor section 26 outputs −105 (150−255) as the error to be diffused to the peripheral pixels. When the output value of the second adder section 23 is 50 and the binarization result is zero (0), the subtractor section 26 outputs 50 (50−0) as the error to be diffused to the peripheral pixels. Hereinafter sometimes the output value(s) of the subtractor section 26 is simply referred to as an error value(s).

The error integrating section 27 previously stores the error values of pixels (processed pixels) which have been processed earlier than the target pixel, and integrates the error values to be diffused to the target pixel from the peripheral pixels.

Figures 4, 5, 6:
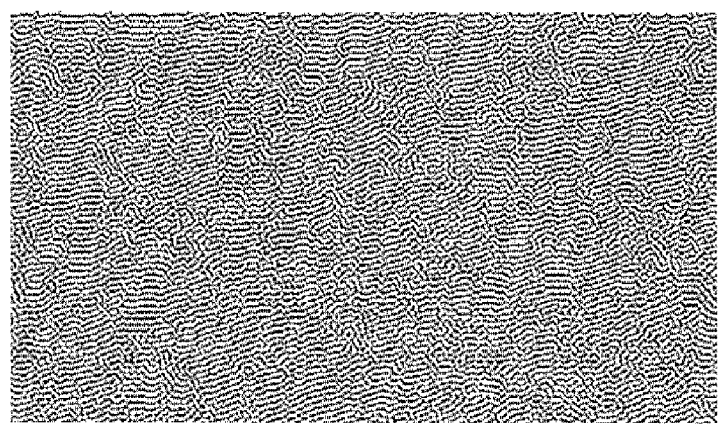
FIG. 4 is a diagram illustrating an example of an error diffusion (error integration) filter included in an error integrating section 27.
FIG. 5 is a diagram illustrating an example of a green noise generation filter included in a green noise generating section 28.
FIG. 6 is an image processed by the error diffusing section 10 of the image processing apparatus according to one or more embodiments of the present invention.

FIG. 4 illustrates an example of an error diffusion (error integration) filter included in the error integrating section 27. In FIG. 4, a transverse direction (I direction) indicates the main scanning direction, and a longitudinal direction (J direction) indicates the sub scanning direction. A black-painted pixel (I=3, J=3) (hereinafter sometimes such coordinates are simply expressed by using brackets, like (3, 3)) indicates the target pixel.

The error integrating section 27 multiplies each of error values of the peripheral pixels by a corresponding predetermined factor, and outputs a value obtained by integrating the error values multiplied by the predetermined factors as an error integrated value diffused to the target pixel. Concretely, the error integrating section 27 outputs a value obtained by integrating: a value obtained by multiplying the error value of upper-left pixel (2, 2) with respect to the target value by $1/16$; a value obtained by multiplying the error value of upper pixel (3, 2) by $5/16$; a value obtained by multiplying the error value of upper-right pixel (4, 2) by $3/16$; and a value obtained by multiplying the error value of left pixel (2, 3) by $7/16$, as the error integrated value diffused to the target pixel.

The green noise generating section 28 previously stores the binarization results of the processed pixels, and generates the green noise to be superimposed on the target pixel on the basis of the binarization results of the processed pixels.

FIG. 5 illustrates an example of a green noise generation filter included in the green noise generating section 28. Since reference characters I, J and black-painted pixels in FIG. 5 have the same meanings as those in FIG. 4, redundant explanations are omitted.

The green noise generating section 28 outputs the value obtained by multiplying each of the values corresponding to the binarization results of the peripheral pixels by the corresponding predetermined factor, and integrating the obtained multiplication value, as the error diffused to the target pixel. When the binarization result is one (1), the value corresponding to the binarization result is 255. When the binarization result is zero (0), the value corresponding to the binarization result is zero (0).

The green noise generating section 28 outputs the value obtained by integrating: the multiplication value obtained by multiplying the value corresponding to the binarization result of the upper pixel (3, 2) with respect to the target pixel by $1/2$; and the multiplication value obtained by multiplying the value corresponding to the binarization result of the left pixel (2, 3) by $1/2$, as the green noise to be superimposed on the target pixel.

For example, the green noise generating section 28 outputs the value of 255 as the green noise superimposed on the target pixel when each of the binarization results of the pixels (3, 2) and (2, 3) is one (1), outputs the value of 127.5 when one of the binarization results of the pixels (3, 2) and (2, 3) is one (1), and outputs the value of zero (0) when each of the binarization results of the pixels (3, 2) and (2, 3) is zero (0).

The flow of the error diffusion processing by the error diffusing section (Y) 10Y of this embodiment will be described with reference to FIG. 2.

(1) When 8-bit data of the target pixel is input as the error diffusion input data, the input noise generating section 21 generates the input noise superimposed on the target pixel, and the first adder section 22 adds the input noise generated by the input noise generating section 21 to the error diffusion input data.

(2) The error integrating section 27 outputs the error integrated value diffused to the target pixel on the basis of the error values of the processed pixels and the error diffusion filter, and the second adder section 23 adds the error integrated value output from the error integrating section 27 to the output value of the first adder section 22.

(3) The green noise generating section 28 generates the green noise superimposed on the target pixel on the basis of the binarization results of the processed pixels and the green noise generation filter, and the third adder section 24 adds the green noise output from the green noise generating section 28 to the output value of the second adder section 23.

(4) The binarizing section 25 compares the output value of the third adder section 24 with the predetermined threshold value, and outputs the binarization result. The binarization result output from the binarizing section 25 is output, as the output of the error diffusing section (Y) 10Y with respect to the target pixel, to the image forming section 11 illustrated in FIG. 1.

(5) The subtractor section 26 subtracts the value (0 or 255) corresponding to the binarization result from the output value of the second adder section 23 to output the error value of the target pixel.

(6) The error integrating section 27 stores the error value of the target pixel output from the subtractor section 26, and thereby preparation for outputting the error integrated value diffused to the pixel to be processed subsequently to the target pixel is completed.

(7) The green noise generating section 28 stores the binarization result of the target pixel output from the binarizing section 25, and thereby preparation for outputting the green noise superimposed on the pixel to be processed subsequently to the target pixel is completed.

(8) The processes of (1) to (7) are repeatedly performed till the input of the error diffusion input data is completed.

The error diffusing section (C) 10C, the error diffusing section (M) 10M and the error diffusing section (K) 10K have the basic configuration same as that of the error diffusing section (Y) 10Y, but may have different settings (parameters) in the input noise generating section 21, the error integrating section 27 and the green noise generating section 28 from those of the error diffusing section (Y) 10Y. The parameters include the screen parameters in the input noise generating section 21, the error diffusion filter in the error integrating section 27 and the green noise generation filter in the green noise generating section 28.

For example, as the screen parameters in the input noise generating section 21, the combination of screen parameters illustrated as screen A in FIG. 3A can be used for the respective colors of Y, M, C and K. Specifically, the following parameters can be used for the colors of Y, M, C and K. The combinations of screen parameters are created so that moire hardly occurs when the parameters are used for the colors of Y, M, C and K, respectively. According to such combinations, moire due to the superimposed input noise can be prevented from occurring.

Y color: Screen ruling 150.0 lpi, Screen angle 90 degrees

M color: Screen ruling 166.4 lpi, Screen angle 56.3 degrees

C. color: Screen ruling 166.4 lpi, Screen angle −56.3 degrees

K color: Screen ruling 189.7 lpi, Screen angle −71.6 degrees

Alternatively, the combination of screen parameters of screen B or screen C can be used instead of the combination of screen parameters of screen A illustrated in FIG. 3A.

According to the image processing apparatus 1 of the first embodiment of the present invention, the error value diffused to the target pixel, the green noise and the noise generated in the input noise generating section 21 are added to the input value (error diffusion input data) of the target pixel, which prevents the black pixels from appearing at a predetermined period. By this, artifacts that easily occur mainly in the intermediate density can be reduced as illustrated in FIG. 6, and thereby the image quality after the error diffusion processing can be improved.

Incidentally, though the first adder section 22, the second adder section 23 and the third adder section 24 have different configurations from one another in the first embodiment, their configurations are not limited to those. For example, the adder section including the multiple adder sections combined to one another, such as the adder section including the combined first adder section 22 and second adder section 23, the adder section including the combined second adder section 23 and third adder section 24, the adder section including the combined first adder section 22, second adder section 23 and third adder section 24, can be adopted.

Second Embodiment

Figure 7:
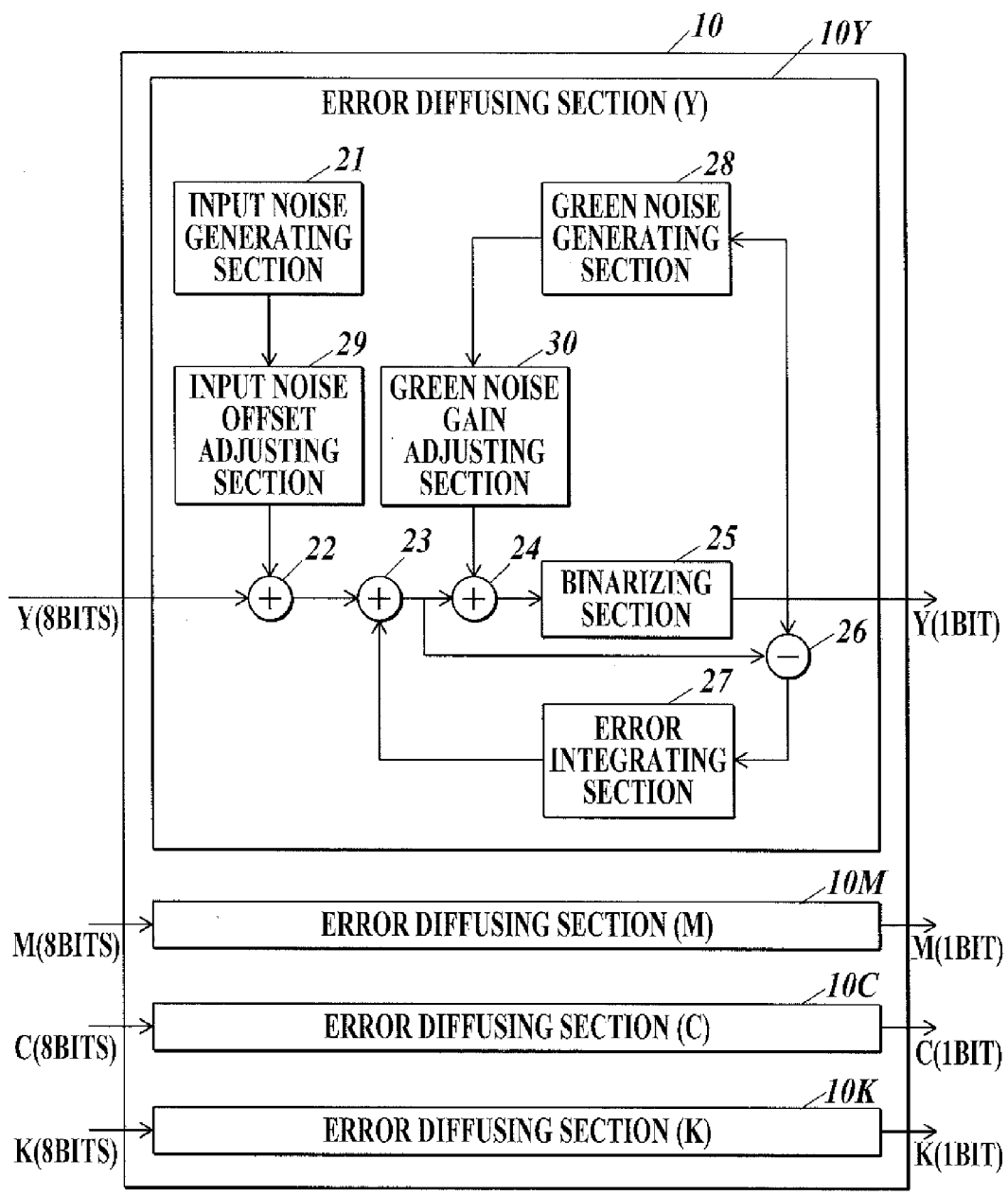
FIG. 7 is a block diagram of the error diffusing section 10 in the image processing apparatus 1 according to a second embodiment.

The image processing apparatus 1 of the second embodiment of the present invention has the configuration where the error diffusing section 10 of the image processing apparatus of the first embodiment further includes an input noise offset adjusting section 29 which adjusts an offset component(s) of the input noises, and a green noise gain adjusting section 30 which adjusts gains of the green noises (see FIG. 7). The same reference characters are used in the configuration corresponding to the configuration of the image processing apparatus 1 of the first embodiment, and redundant explanations are omitted.

The block diagram of the image processing apparatus 1 of the second embodiment is same as FIG. 1.

FIG. 7 is a block diagram of the error diffusing section 10 of the image processing apparatus 1 of the second embodiment.

The input noise offset adjusting section 29 adjusts the offset component of the input noise so that the offset component of the input noise superimposed on the error diffusion input data becomes a predetermined value in minus. For example, the input noise offset adjusting section 29 adds −12/255 to each input noise generated for each pixel by the input noise generating section 21 to perform adjustment so that the offset component of the input noise becomes −12/255. Hereinafter sometimes the value(s) added to the input noise(s) generated by the input noise generating section 21 is referred to as an offset adjustment value(s).

The green noise gain adjusting section 30 multiplies the green noise generated by the green noise generating section 28 by a predetermined gain value (magnification factor) as a first gain value so as to adjust the gain of the green noise. The green noise gain adjusting section 30 can make the green noise superimposed on the target pixel smaller by multiplying the green noise generated by the green noise generating section 28 by the gain value that is smaller than one (1), and can make the green noise superimposed on the target pixel larger by multiplying the green noise by the gain value that is larger than one (1).

The green noise filter is configured to generate the green noise having the value in plus when the peripheral pixels (i.e. the pixels (3, 2) and (2, 3)) include the pixel whose binarization result is one (1). Thus, the green noise generating section 28 generates the noise having the value in plus (including zero (0)), and the third adder section 24 always adds the value in plus (including zero (0)) to the output value of the second adder section 23. As a result, the value (output value of the third adder section 24) after addition of the green noise by the third adder section 24 always has the larger numerical value (including the same numerical value) than the value (output value of the second adder section 23) before addition of the green noise by the third adder section 24. Accordingly, the density of the binarized image (binarization result) tends to get higher than the original density. Thus, the superimposed green noise has a function to make the image density higher.

In the error diffusing section 10 of the image processing apparatus 1 of this embodiment, the input noise offset adjusting section 29 adjusts the offset component of the input noise superimposed on the error diffusion input data so that the offset component of the input noise has the predetermined value in minus, so as to neutralize the function of the superimposed green noise to make the image density higher.

The image processing apparatus 1 of this embodiment can receive the setting (green noise intensity setting) related to the intensity of the green noise from a user. In the image processing apparatus 1, the operation/display section 16 displays the screen illustrated in FIG. 8, on which the green noise intensity setting is received by receiving the selection of one of keys "WEAK", "STANDARD" and "STRONG" from a user. When "WEAK" is selected, the green noise gain adjusting section 30 multiplies the green noise generated by the green noise generating section 28 by the gain value smaller than one (1). When "STANDARD" is selected, the green noise gain adjusting section 30 sets the gain value to one (1). When "STRONG" is selected, the green noise gain adjusting section 30 sets the gain value to the value larger than one (1). Thus, the green noise gain adjusting section 30 can adjust the intensity of the green noise by changing the gain value by which the green noise is multiplied.

As described above, the superimposed green noise has the function to make the image density higher. The larger the intensity of the green noise is, the larger the degree to which the image density becomes high. Accordingly, the input noise offset adjusting section 29 may change an adjustment width of offset depending on the intensity of the green noise. Specifically, the input noise offset adjusting section 29 sets the offset adjustment value to −6/255 when "WEAK" is set as the intensity of the green noise, sets the offset adjustment value to −12/255 when "STANDARD" is set, and sets the offset adjustment value to −24/255 when "STRONG" is set.

Thus, the offset component of the noise superimposed on the input noise can be set to the value according to the degree to which the density becomes high due to the superimposed green noise, by changing the offset adjustment value depending on the intensity of the green noise. Accordingly, precision of the density of the error diffusion output data can be further improved.

The flow of the error diffusion processing by the error diffusing section (Y) 10Y of this embodiment will be described with reference to FIG. 7.

(1) The screen illustrated in FIG. 8 receives the green noise intensity setting from a user.

(2) When 8-bit data of the target pixel is input as the error diffusion input data, the input noise generating section 21 generates the input noise superimposed on the target pixel, and the input noise offset adjusting section 29 adds the offset adjustment value according to the green noise intensity setting to the input noise.

(3) The first adder section 22 adds the input noise after offset adjustment to the error diffusion input data.

(4) The error integrating section 27 outputs the error integrated value diffused to the target pixel on the basis of the error values of the processed pixels and the error diffusion filter, and the second adder section 23 adds the error integrated value output from the error integrating section 27 to the output value of the first adder section 22.

(5) The green noise generating section 28 generates the green noise superimposed on the target pixel on the basis of the binarization results of the processed pixels and the green noise generation filter, and the green noise gain adjusting section 30 multiplies the green noise by the gain value according to the green noise intensity setting.

(6) The third adder section 24 adds the green noise after gain adjustment to the output value of the second adder section 23.

(7) The binarizing section 25 compares the output value of the third adder section 24 with the predetermined threshold value to output the binarization result. The binarization result output from the binarizing section 25 is output, as the output of the error diffusing section (Y) 10Y with respect to the target pixel, to the image forming section 11 illustrated in FIG. 1.

(8) The subtractor section 26 subtracts the value (0 or 255) corresponding to the binarization result from the output value of the second adder section 23 to output the error value of the target pixel.

(9) The error integrating section 27 stores the error value of the target pixel output from the subtractor section 26, and thereby preparation for outputting the error integrated value diffused to the pixel to be processed subsequently to the target pixel is completed.

(10) The green noise generating section 28 stores the binarization result of the target pixel output from the binarizing section 25, and thereby preparation for outputting the green noise superimposed on the pixel to be processed subsequently to the target pixel is completed.

(11) The processes of (1) to (10) are repeatedly performed till the input of the error diffusion input data is completed.

According to the image processing apparatus 1 of the second embodiment of the present invention, the offset component of the input noise superimposed on the error diffusion input data are adjusted so that the offset component of the input noise has the predetermined value in minus, and thereby the function of the superimposed green noise to make the image density higher is neutralized. By this, artifacts which easily occur mainly in the intermediate density can be reduced, and precision of the density of the binarization result can be improved.

Moreover, the offset component of the noise superimposed on the input noise can be set to the value according to the degree to which the superimposed green noise makes the density higher, by receiving the selection of the intensity of the green noise from a user and automatically changing the offset adjustment value depending on the selected intensity of the green noise. By this, artifacts can be adjusted to be reduced according to liking of a user, and precision of the density of the binarization result at the time of changing the intensity of the green noise can be improved.

Sometimes the property of image formation by the electrophotographic process in the image forming section 11 changes depending on time, which changes the degree of conspicuousness of artifacts. For example, when a user sets "STRONG" as the green noise intensity setting because the density unevenness becomes worse due to change with time, the image processing apparatus 1 generates the green noise with the stronger gain value than standard one, and changes the offset adjustment value of the input noise according to the stronger gain value. Thus, even when "STRONG" is set as the green noise intensity setting, the offset is changed according to the green noise. Therefore, precision of the density of the binarization result can be improved, and the image quality after the error diffusion processing can be improved.

Third Embodiment

Figure 9:
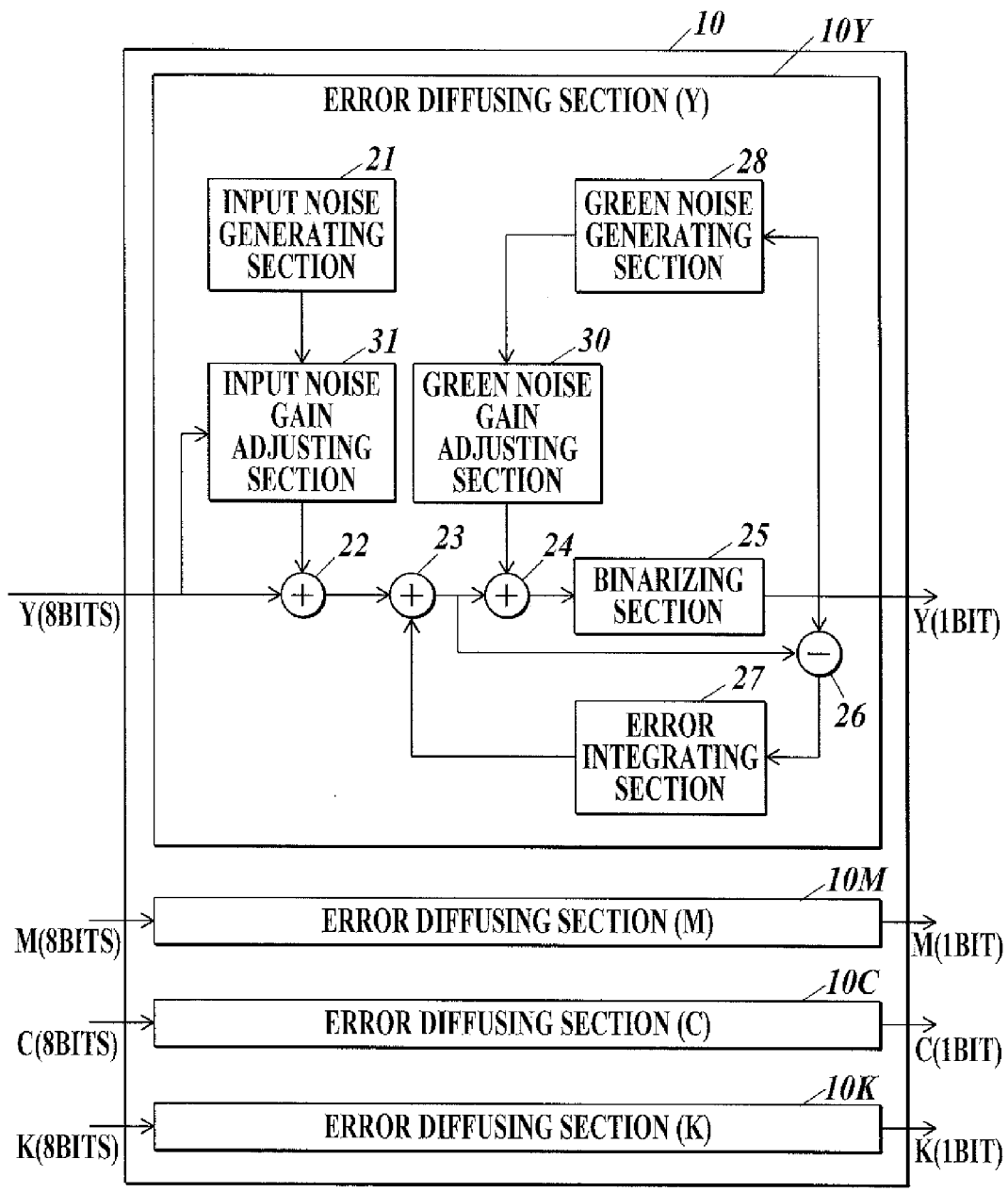
FIG. 9 is a block diagram of the error diffusing section 10 in the image processing apparatus 1 according to a third embodiment.

The image processing apparatus 1 of the third embodiment of the present invention has the error diffusing section 10 same as that of the image processing apparatus 1 of the second embodiment except that an input noise gain adjusting section 31 is provided instead of the input noise offset adjusting section 29 (see FIG. 9). The same reference characters are used in the configuration corresponding to the configuration of the image processing apparatus 1 of the second embodiment, and redundant explanations are omitted.

The block diagram of the image processing apparatus 1 of the third embodiment is same as FIG. 1.

FIG. 9 is a block diagram of the error diffusing section 10 of the image processing apparatus 1 of the third embodiment.

The input noise gain adjusting section 31 multiplies the input noise generated by the input noise generating section 21 by a predetermined gain value (magnification factor) as a second gain value so as to adjust the gain of the green noise. The input noise gain adjusting section 31 can make the input noise superimposed on the target pixel smaller by multiplying the input noise generated by the input noise generating section 21 by the gain value smaller than one (1), and can make the input noise superimposed on the target pixel larger by multiplying the input noise by the gain value larger than one (1).

In the meantime, the artifacts, which occur in the binary image, tend to occur in the intermediate density at which two conditions are met, the condition including: a first condition that the arrangement of the weighting factors of the green noise filter coincides with the arrangement of the black pixels in the peripheral pixels; and a second condition that large negative errors occur due to binarization.

Accordingly, the input noise gain adjusting section 31 adjusts the gain of the input noise depending on the value (density) of the target pixel. Specifically, the input noise gain adjusting section 31 makes the gain small when the value of the target pixel is small (low density) or large (high density), and makes the gain large when the value of the target pixel is in a middle-level (intermediate density) as half tone.

Figure 10:
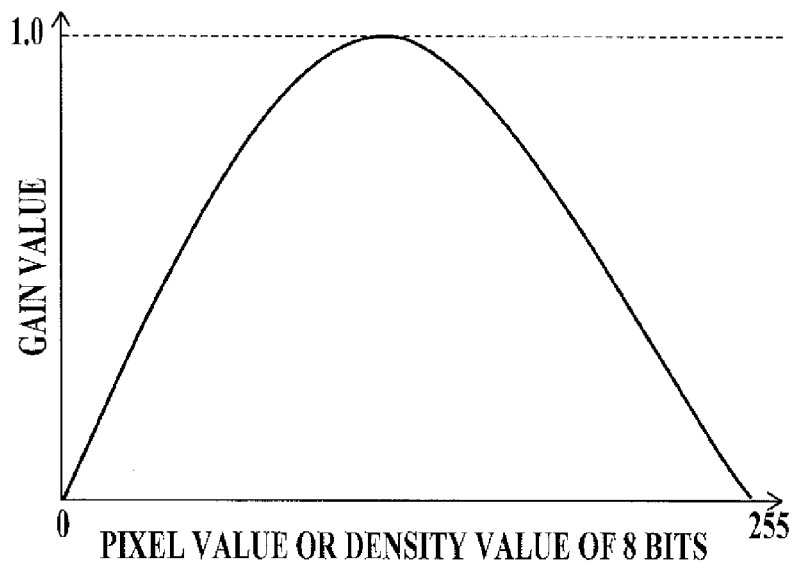
FIG. 10 is an example graph illustrating a relationship between a target pixel value and a gain value of an input noise.

FIG. 10 is a graph illustrating the relationship between the value of the target pixel and the gain value of the input noise. The horizontal axis indicates the pixel value, and the vertical axis indicates the gain value of the input noise. The gain value of the input noise gradually becomes larger from the low density to the intermediate density, becomes the maximum value at the intermediate density, and gradually becomes smaller from the intermediate density to the high density.

For example, the intermediate density is within a range of 50%±25% of the density value, when referring to FIG. 10. In other words, the intermediate density is within the range of 128±25% of the density value. The low density and the high density are within ranges other than the range of the intermediate density. Therefore, the gain value corresponding to the low density or the high density becomes smaller than the gain value corresponding to the intermediate density.

Incidentally, the range of the intermediate density is mere example, and may be arbitrarily changed depending on the property of the implemented image processing apparatus.

The input noise gain adjusting section 31 previously stores a Look Up Table (LUT) describing the relationship between the pixel value and the gain value of the input noise illustrated in the graph of FIG. 10, refers to the LUT based on the value of the target pixel to obtain the gain value corresponding to the target pixel, and multiplies the green noise generated by the input noise generating section 21 by the obtained gain value. Alternatively, the input noise gain adjusting section 31 may previously store a numerical expression for calculating the gain value based on the value of the target pixel, instead of the LUT, to obtain the gain value corresponding to the target pixel by using the numerical expression.

Also in the image processing apparatus 1 of this embodiment, the green noise gain adjusting section 30 can adjust the intensity of the green noise on the basis of the green noise intensity setting received from a user via the screen illustrated in FIG. 8.

Figure 11:
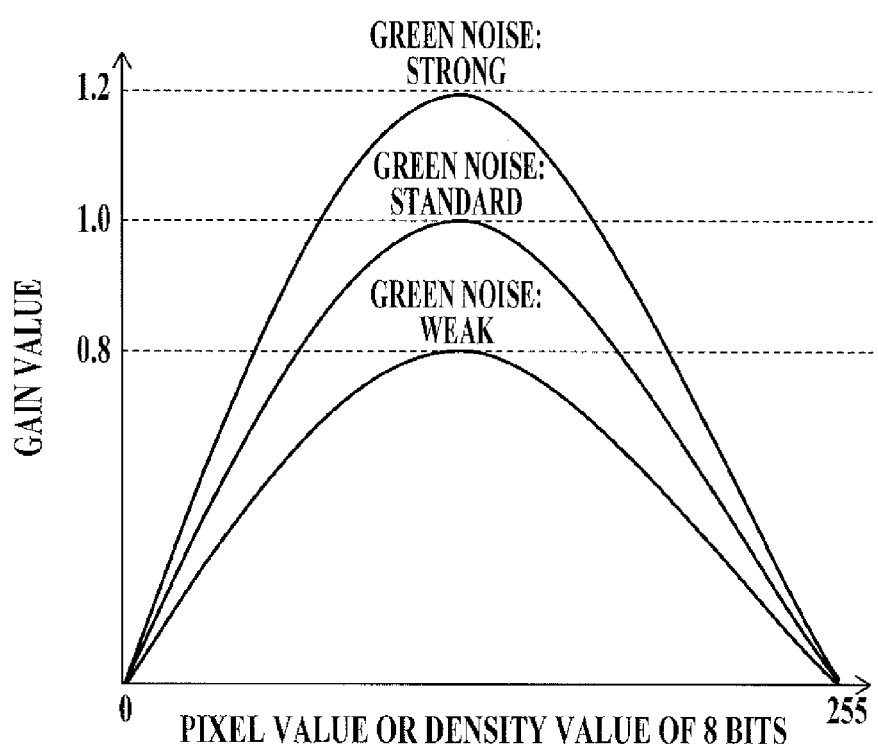
FIG. 11 is an example graph illustrating the gain values according to the intensity of the green noise.

In the meantime, the larger the intensity of the green noise is, the stronger the artifacts occurring in the binary image become. Accordingly, the input noise gain adjusting section 31 may be capable of changing the gain depending on the intensity of the green noise. Specifically, as illustrated in FIG. 11, the input noise gain adjusting section 31 may previously store a plurality of LOTS according to the intensities of the green noises, and may obtain the gain value corresponding to the target pixel by referring to the LUT according to the intensity of the green noise. In this case, as illustrated in FIG. 11, the larger (green noise: STRONG) the intensity of the green noise is, the larger the gain value of the input noise becomes, and the smaller (green noise: WEAK) the intensity of the green noise is, the smaller the gain value of the input noise becomes.

For example, when the operation/display section 16 displays the screen illustrated in FIG. 8 and receives the green noise intensity setting by receiving selection of one of the keys "WEAK", "STANDARD" and "STRONG" via the screen, the input noise gain adjusting section 31 obtains the gain value corresponding to the target pixel by referring to the LUT corresponding to the intensity of the green noise.

Referring to now to FIG. 8 and FIG. 11, when "WEAK" is selected, since the green noise gain adjusting section 30 multiplies the green noise generated by the green noise generating section 28 by the gain value smaller than one (1), the input noise gain adjusting section 31 refers to the LUT by which the maximum gain value becomes 0.8 depending on the intensity of the green noise to obtain the gain value corresponding to the target pixel. The input noise gain adjusting section 31 refers to the LUT by which the maximum gain value becomes one (1) to obtain the gain value corresponding to the target pixel when "STANDARD" is selected, and refers to the LUT by which the maximum gain value becomes 1.2 to obtain the gain value corresponding to the target pixel when "STRONG" is selected. Thus, the input noise gain adjusting section 31 obtains the gain value corresponding to the target pixel by referring to the LUT corresponding to the intensity of the green noise selected by a user.

The flow of the error diffusion processing by the error diffusing section (Y) 10Y of this embodiment will be described with reference to FIG. 9.

(1) The screen illustrated in FIG. 8 receives the green noise intensity setting from a user.

(2) When 8-bit data of the target pixel is input as the error diffusion input data, the input noise generating section 21 generates the input noise superimposed on the target pixel.

(3) The input noise gain adjusting section 31 refers to the LUT corresponding to the green noise intensity setting based on the value of the target pixel to obtain the gain value, and multiplies the input noise by the obtained gain value.

(4) The first adder section 22 adds the input noise after gain adjustment to the error diffusion input data.

(5) The error integrating section 27 outputs the error integrated value diffused to the target pixel on the basis of the error value of the processed pixels and the error diffusion filter, and the second adder section 23 adds the error integrated value output from the error integrating section 27 to the output value of the first adder section 22.

(6) The green noise generating section 28 generates the green noise superimposed on the target pixel on the basis of the binarization results of the processed pixels and the green noise generation filter, and the green noise gain adjusting section 30 multiplies the green noise by the gain value according to the green noise intensity setting.

(7) The third adder section 24 adds the green noise after gain adjustment to the output value of the second adder section 23.

(8) The binarizing section 25 compares the output value of the third adder section 24 with the predetermined threshold value to output the binarization result. The binarization result output from the binarizing section 25 is output, as the output of the error diffusing section (Y) 10Y with respect to the target pixel, to the image forming section 11 illustrated in FIG. 1.

(9) The subtractor section 26 subtracts the value (0 or 255) corresponding to the binarization result from the output value of the second adder section 23 to output the error value of the target pixel.

(10) The error integrating section 27 stores the error value of the target pixel output from the subtractor section 26, and thereby preparation for outputting the error integrated value diffused to the pixel to be processed subsequently to the target pixel is completed.

(11) The green noise generating section 28 stores the binarization result of the target pixel output from the binarizing section 25, and thereby preparation for outputting the green noise superimposed on the pixel to be processed subsequently to the target pixel is completed.

(12) The processes of (1) to (11) are repeatedly performed till the input of the error diffusion input data is completed.

According to the image processing apparatus 1 of the third embodiment of the present invention, the input noise gain adjusting section 31 obtains the gain value by referring to the LOT corresponding to the green noise intensity setting on the basis of the value of the target pixel of the error diffusion input data, and multiplies the input noise by the obtained gain value. By this, the input noise can be multiplied by the small gain value when the value of the target pixel is small (low density) or large (high density), and can be multiplied by the large gain value when the value of the target pixel is in a middle-level (intermediate density).

In the meanwhile, the input noise superimposed on the error diffusion input data is effective in suppressing artifacts in the middle density, but has some influences on the image quality also in the low or high density in which artifacts are neutral. Such influences do not always improve the image quality.

The image processing apparatus 1 of the third embodiment of the present invention has the above configuration and thus can superimpose the input noise according to incidence of artifacts to the target pixel. According to such configuration, artifacts can be effectively prevented from occurring in the intermediate density, while suppressing the influence due to the superimposed input noise in the low or high density in which artifacts are neutral. Thus, the image quality after the error diffusion processing can be improved.

Fourth Embodiment

Figure 12:
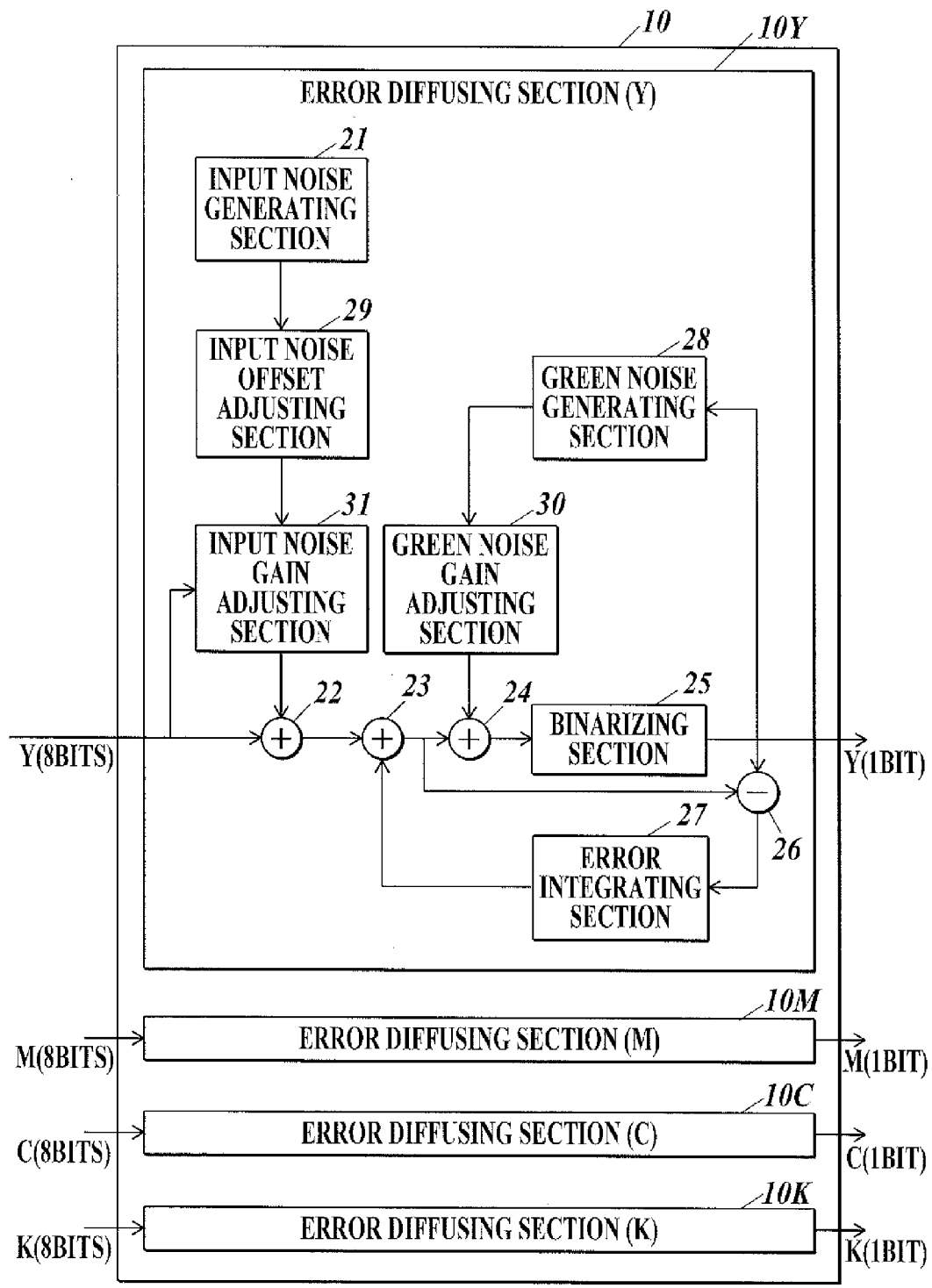
FIG. 12 is a block diagram of the error diffusing section 10 in the image processing apparatus 1 according to a fourth embodiment.
Figure 13:
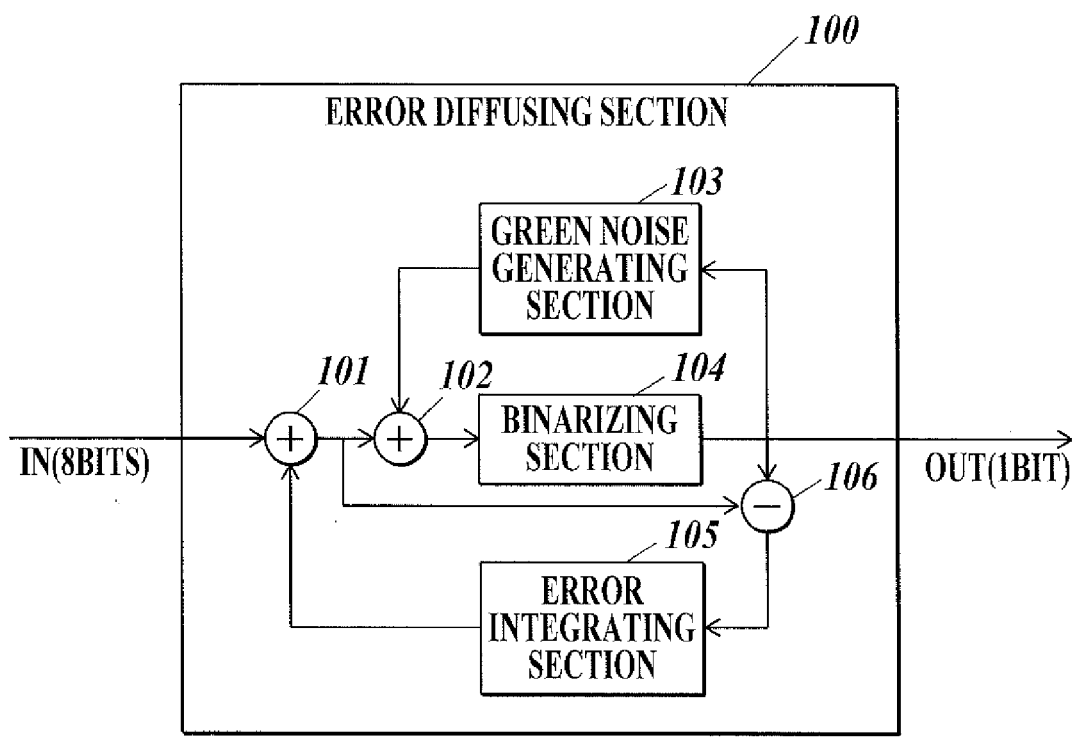
FIG. 13 is a block diagram illustrating processing contents of a conventional error diffusing section 100 having a configuration which superimposes green noises.
Figure 14:
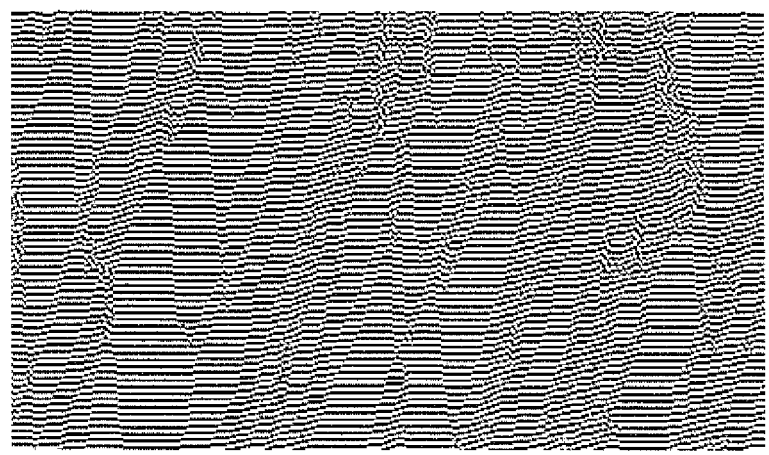
FIG. 14 is an image processed by the conventional error diffusing section 100.

The image processing apparatus 1 of the fourth embodiment of the present invention has the configuration where the error diffusing section 10 of the image processing apparatus 1 of the first embodiment further includes the input noise offset adjusting section 29 and the green noise gain adjusting section 30 of the image processing apparatus 1 of the second embodiment, and the input noise gain adjusting section 31 of the image processing apparatus 1 of the third embodiment (see FIG. 12). The same reference characters are used in the configuration corresponding to the configurations of the image processing apparatuses 1 of the first to third embodiments, and redundant explanations are omitted.

The block diagram of the image processing apparatus 1 of the fourth embodiment is same as FIG. 1.

FIG. 12 is a block diagram of the error diffusing section 10 of the image processing apparatus 1 of this embodiment. Because the configurations contained in the error diffusing section 10 of this embodiment are same as the corresponding configurations of the error diffusing sections 10 of the first to third embodiments, redundant explanations are omitted. The flow of the error diffusion processing by the error diffusing section (Y) 10Y will be described below with reference to FIG. 12.

(1) The screen illustrated in FIG. 8 receives the green noise intensity setting from a user.

(2) When 8-bit data of the target pixel is input as the error diffusion input data, the input noise generating section 21 generates the input noise superimposed on the target pixel.

(3) The input noise offset adjusting section 29 adds the offset adjustment value according to the green noise intensity setting to the input noise.

(4) The input noise gain adjusting section 31 obtains the gain value by referring to the LUT corresponding to the green noise intensity setting on the basis of the value of the target value, and multiplies the input noise after offset adjustment by the obtained gain value.

(5) The first adder section 22 adds the input noise whose offset and gain have been adjusted to the error diffusion input data.

(6) The error integrating section 27 outputs the error integrated value diffused to the target pixel on the basis of the error values of the processed pixels and the error diffusion filter, and the second adder section 23 adds the error integrated value output from the error integrating section 27 to the output value of the first adder section 22.

(7) The green noise generating section 28 generates the green noise superimposed on the target pixel on the basis of the binarization results of the processed pixels and the green noise generation filter, and the green noise gain adjusting section 30 multiplies the green noise by the gain value corresponding to the green noise intensity setting.

(8) The third adder section 24 adds the green noise after gain adjustment to the output value of the second adder section 23.

(9) The binarizing section 25 compares the output value of the third adder section 24 with the predetermined threshold value to output the binarization result. The binarization result output from the binarizing section 25 is output, as the output of the error diffusing section (Y) 10Y with respect to the target pixel, to the image forming section 11 illustrated in FIG. 1.

(10) The subtractor section 26 subtracts the value (0 or 255) corresponding to the binarization result from the output value of the second adder section 23 to output the error value of the target pixel.

(11) The error integrating section 27 stores the error value of the target pixel output from the subtracting section 26, and thereby preparation for outputting the error integrated value diffused to the pixel to be processed subsequently to the target pixel is completed.

(12) The green noise generating section 28 stores the binarization result of the target pixel output from the binarizing section 25, and thereby preparation for outputting the green noise superimposed on the pixel to be processed subsequently to the target pixel is completed.

(13) The processes of (1) to (12) are repeatedly performed till the input of the error diffusion input data is completed.

The image processing apparatus 1 of the fourth embodiment of the present invention adjusts the offset component of the input noise so that the offset component of the input noise superimposed on the error diffusion input data by the input noise offset adjusting section 29 has the predetermined value in minus. Moreover, the input noise gain adjusting section 31 obtains the gain value by referring to the LUT corresponding to the green noise intensity setting on the basis of the value of the target pixel of the error diffusion input data, and multiplies the input noise subjected to offset adjustment by the obtained gain value.

The image processing apparatus 1 of the fourth embodiment of the present invention has the above configuration and thus multiplies the input noise, which has been subjected to offset adjustment, by the gain value according to the value of the target pixel, before superimposing the input noise on the error diffusion input data. According to this configuration, the input noise subjected to offset adjustment can be multiplied by the small gain value when the value of the target pixel is small (low density) or large (high density), and can be multiplied by the large gain value when the value of the target pixel is in a middle-level (intermediate density).

In the meantime, when the value of the target pixel is small (low density) or large (high density), the degree of artifacts due to the green noise is small, and also the degree to which the density becomes high due to the green noise is small. On the other hand, when the value of the target pixel is in a middle-level (intermediate density), the degree of artifacts due to the green noise is large, and also the degree to which the density becomes high due to the green noise is large.

In such a case, if the offset is adjusted according to the intermediate density uniformly with respect to all the densities, offset adjustment is excessively performed with respect to the pixels of low or high density. As a result, the pixels of low or high density are reproduced as the density lower than the original density, and accordingly precision of the reproduced density lowers as a whole.

Therefore, in the image processing apparatus 1 of the fourth embodiment of the present invention, the noise subjected to offset adjustment is multiplied by the large gain value with respect to the pixels of the intermediate density so as to sufficiently perform offset adjustment, whereas the noise subjected to offset adjustment is multiplied by the small gain value with respect to the pixels of the low and high density, in which artifacts are neutral, so as to suppress excess offset adjustment. Thus, by gaining a weight of offset adjustment (intensively performing offset adjustment) with respect to the intermediate density, at which the degree of artifacts due to the green noise is large and also the degree to which the density is increased by the green noise is large, precision of the reproduced density can be improved over the whole density including the low and high densities, and thereby the image quality after the error diffusion processing can be improved.

Incidentally, in the image processing apparatuses 1 according to the first to fourth embodiments, the error diffusion processing, which is executed by the error diffusing sections 10 illustrated in FIGS. 2, 7, 9 and 12, is realized by hardware such as FPGA and ASIC. Alternatively, the error diffusion processing can be performed by executing programs stored in the storage section 3, by the CPU, namely the control section 2 included in the image processing apparatus 1.

The image processing apparatuses 1 according to the first to fourth embodiments of the present invention are not limited to the MFPs, and can be other devices/apparatuses (e.g. a scanner, printer and facsimile machine) including the error diffusing section 10 of the present invention.

Japanese Patent Application No. 2014-059537 filed on Mar. 24, 2014 is hereby incorporated by reference in its entirety.

What is claimed is:

1. An image processing apparatus that receives a pixel value of each pixel of an image, the apparatus comprising:
    a memory;
    a central processing unit (CPU) connected to the memory and that processes the image by: generating an AM screen noise or FM screen noise;
    generating a green noise superimposed on a target pixel by using an after-binarization output value of a binarized processed pixel;
    adjusting an offset component of the AM screen noise or FM screen noise so that the offset component of the AM screen noise or FM screen noise has a predetermined value in minus;
    adding an error integrated value diffused to the target pixel, the green noise and the AM screen noise or FM screen noise, to the pixel value of the target pixel;
    binarizing, with a threshold value, the pixel value of the target pixel to which the error integrated value, the green noise and the AM screen noise or FM screen noise are added;
    calculating an error value due to binarization by calculating a difference between an output value of the target pixel after the binarization and the pixel value of the target pixel to which the error integrated value and the AM screen noise or FM screen noise are added; and
    outputting the error integrated value diffused to the target pixel, by using the calculated error value with respect to the binarized processed pixel, wherein
    the CPU outputs the processed image for display or printing.

2. The image processing apparatus of claim 1, wherein the CPU performs the adjustment by adding the predetermined value in minus to the AM screen noise or FM screen noise generated for the each pixel so that the offset component of the AM screen noise or FM screen noise has the predetermined value in minus.

3. The image processing apparatus of claim 1, wherein the CPU adjusts a gain of the green noise by multiplying the green noise by a first gain value.

4. The image processing apparatus of claim 3, wherein the CPU changes the first gain value, by which the green noise is multiplied, depending on an intensity of the green noise.

5. The image processing apparatus of claim 1, wherein the CPU:
    adjusts a gain of the green noise by multiplying the green noise by a first gain value,
    changes the first gain value, by which the green noise is multiplied, depending on an intensity of the green noise, and
    adjusts the offset component depending on the changed first gain value.

6. The image processing apparatus of claim 1, wherein the CPU adjusts a gain of the AM screen noise or FM screen noise by multiplying the AM screen noise or FM screen noise by a second gain value.

7. The image processing apparatus of claim 6, wherein the CPU adjusts the gain of the AM screen noise or FM screen noise depending on the pixel value of the target pixel.

8. The image processing apparatus of claim 6, wherein the CPU makes the second gain value, at the time when the pixel value of the target pixel is not halftone, smaller than the second gain value at the time when the pixel value of the target pixel is halftone.

9. The image processing apparatus of claim 1, wherein the CPU:
    adjusts a gain of the green noise by multiplying the green noise by a first gain value,
    adjusts a gain of the AM screen noise or FM screen noise by multiplying the AM screen noise or FM screen noise by a second gain value, and
    adjusts the gain of the AM screen noise or FM screen noise in response to changing of the first gain value by which the green noise is multiplied, the changing being executed by the CPU depending on the intensity of the green noise.

10. The image processing apparatus of claim 1, wherein a spatial frequency corresponding to the AM screen noise or FM screen noise is a spatial frequency having low sensitivity in a human visual spatial frequency characteristic.

11. A controlling method in an image processing apparatus, the method comprising:
    receiving a pixel value of each pixel of an image;
    processing the image, using a central processing unit (CPU) connected to a memory of the image processing apparatus, by:
        generating an AM screen noise or FM screen noise;
        generating a green noise superimposed on a target pixel by using an after-binarization output value of a binarized processed pixel;
        adjusting an offset component of the AM screen noise or FM screen noise so that the offset component of the AM screen noise or FM screen noise has a predetermined value in minus;

outputting an error integrated value diffused to the target pixel, by using an error value calculated with respect to the binarized processed pixel;

adding the error integrated value diffused to the target pixel, the green noise and the AM screen noise or FM screen noise, to the pixel value of the target pixel;

binarizing, with a threshold value, the pixel value of the target pixel to which the error integrated value, the green noise and the AM screen noise or FM screen noise are added; and calculating an error value due to binarization by calculating a difference between an output value of the target pixel after the binarization and the pixel value of the target pixel to which the error integrated value and the AM screen noise or FM screen noise are added; and outputting, using the CPU, the processed image for display or printing.

12. A non-transitory computer-readable recording medium storing a program for causing an image processing apparatus to execute:

receiving a pixel value of each pixel of an image;

processing the image, using a central processing unit (CPU) connected to a memory of the image processing apparatus, by:

generating an AM screen noise or FM screen noise;

generating a green noise superimposed on a target pixel by using an after-binarization output value of a binarized processed pixel;

adjusting an offset component of the AM screen noise or FM screen noise so that the offset component of the AM screen noise or FM screen noise has a predetermined value in minus;

outputting an error integrated value diffused to the target pixel, by using an error value calculated with respect to the binarized processed pixel;

adding the error integrated value diffused to the target pixel, the green noise and the AM screen noise or FM screen noise, to the pixel value of the target pixel;

binarizing, with a threshold value, the pixel value of the target pixel to which the error integrated value, the green noise and the AM screen noise or FM screen noise are added; and calculating an error value due to binarization by calculating a difference between an output value of the target pixel after the binarization and the pixel value of the target pixel to which the error integrated value and the AM screen noise or FM screen noise are added; and outputting, using the CPU, the processed image for display or printing.

\* \* \* \* \*